United States Patent
Kidooka et al.

(10) Patent No.: US 9,057,336 B2
(45) Date of Patent: Jun. 16, 2015

(54) CONTROL APPARATUS FOR INTERNAL COMBUSTION ENGINE AND CONTROL APPARATUS FOR VEHICLE EQUIPPED WITH INTERNAL COMBUSTION ENGINE

(75) Inventors: Akio Kidooka, Ashigarakami-gun (JP); Yoshikazu Jikuhara, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 370 days.

(21) Appl. No.: 13/583,415

(22) PCT Filed: Mar. 19, 2010

(86) PCT No.: PCT/JP2010/054844
§ 371 (c)(1),
(2), (4) Date: Sep. 7, 2012

(87) PCT Pub. No.: WO2011/114518
PCT Pub. Date: Sep. 22, 2011

(65) Prior Publication Data
US 2013/0008412 A1   Jan. 10, 2013

(51) Int. Cl.
*F02D 1/00*   (2006.01)
*F02D 41/12*   (2006.01)
(Continued)

(52) U.S. Cl.
CPC ............... *F02D 41/126* (2013.01); *F01L 1/34* (2013.01); *F01L 13/0005* (2013.01); *F02D 13/08* (2013.01); *F02D 17/02* (2013.01); *F02D 2041/001* (2013.01); *F02D 2041/0012* (2013.01); *Y02T 10/18* (2013.01)

(58) Field of Classification Search
CPC .... F02M 69/002; F02M 69/005; F02M 55/02
USPC ......... 123/445, 446, 456, 457, 461, 464, 468, 123/478, 480, 319, 321, 345–348, 90.1, 123/90.15, 434, 481, 198 F; 701/103, 104, 701/112
See application file for complete search history.

(56) References Cited

U.S. PATENT DOCUMENTS

2001/0050067 A1 * 12/2001 Sato ........................ 123/90.17
2005/0166895 A1 * 8/2005 Yoshizawa et al. ........... 123/346
(Continued)

FOREIGN PATENT DOCUMENTS

JP    60 45737    3/1985
JP    7 119502    5/1995
(Continued)

OTHER PUBLICATIONS

International Search Report Issued Jun. 1, 2010 in PCT/JP10/054844 Filed Mar. 19, 2010.

*Primary Examiner* — John Kwon
(74) *Attorney, Agent, or Firm* — Oblon, McClelland, Maier & Neustadt, L.L.P.

(57) ABSTRACT

Provided is a control apparatus for an internal combustion engine that can suppress blowback of in-cylinder residual gas to an intake passage when reverting from a fuel-cut operation accompanied by valve stopping control of an intake valve while suppressing an oil ascent during execution of the fuel-cut operation, and a control apparatus for a vehicle equipped with the internal combustion engine. When executing a fuel-cut operation accompanied by intake valve stopping control, advancement control of the opening/closing timing of an exhaust valve (32) is executed. If the advancement control is being executed in a case where a request to revert from the fuel-cut operation has been detected, an advance amount of the opening/closing timing of the exhaust valve (32) is retarded so as to become less than or equal to a predetermined value.

5 Claims, 9 Drawing Sheets

(51) Int. Cl.
  *F01L 1/34* (2006.01)
  *F01L 13/00* (2006.01)
  *F02D 13/08* (2006.01)
  *F02D 17/02* (2006.01)
  *F02D 41/00* (2006.01)

(56) References Cited

U.S. PATENT DOCUMENTS

| | | |
|---|---|---|
| 2008/0041339 A1 | 2/2008 | Nishikiori et al. |
| 2009/0048763 A1 | 2/2009 | Nishikiori et al. |
| 2010/0185380 A1* | 7/2010 | Katou et al. .................. 701/103 |

FOREIGN PATENT DOCUMENTS

| | | |
|---|---|---|
| JP | 2000 34941 | 2/2000 |
| JP | 2001 207877 | 8/2001 |
| JP | 2005 105869 | 4/2005 |
| JP | 2006 144685 | 6/2006 |
| JP | 2006 249980 | 9/2006 |
| JP | 2006 275003 | 10/2006 |
| JP | 2007 211720 | 8/2007 |
| JP | 2009 92048 | 4/2009 |
| WO | 2005 056995 | 6/2005 |

* cited by examiner

- 42 — Crank angle
- 44 — Exhaust cam angle
- 46 — Accelerator pedal position
- 48 — Oil temperature
- 50 — In-cylinder pressure
- 52 — Shift position

CONTROL APPARATUS FOR INTERNAL COMBUSTION ENGINE AND CONTROL APPARATUS FOR VEHICLE EQUIPPED WITH INTERNAL COMBUSTION ENGINE

TECHNICAL FIELD

The present invention relates to a control apparatus for an internal combustion engine and a control apparatus for a vehicle equipped with the internal combustion engine, and more particularly to a control apparatus for an internal combustion engine that includes a valve stop mechanism that is capable of stopping and maintaining an intake valve in a closed position and a control apparatus for a vehicle that is equipped with the internal combustion engine.

BACKGROUND ART

A conventional control apparatus for a multi-cylinder internal combustion engine is disclosed, for example, in Patent Document 1. The aforementioned conventional control apparatus is configured so that, at a time of reduced-cylinder operation that halts the operation of some cylinders, operation of an intake valve in a halted cylinder is stopped at the closed position. In addition, the aforementioned conventional control apparatus is configured so as to retard an opening timing of an exhaust valve in a halted cylinder so as to be a predetermined timing that is after the expansion bottom dead center, and to also advance a closing timing of the relevant exhaust valve so as to be a predetermined timing that is before the exhaust top dead center. According to this control, in the halted cylinder in which the intake valve is placed in a closed-valve stopped state, exhaust gas can be caused to remain inside the halted cylinder by advancing the closing timing of the exhaust valve. It is thereby possible to suppress the occurrence of a state in which an excessive negative pressure is generated inside the halted cylinder, and suppress an oil ascent in the halted cylinder.

The applicants are aware of the following documents, which includes the above described document, as documents related to the present invention.

CITATION LIST

Patent Documents

Patent Document 1: Japanese Laid-open Patent Application Publication No. Hei 7-119502
Patent Document 2: Japanese Laid-open Patent Application Publication No. 2000-34941
Patent Document 3: Japanese Laid-open Patent Application Publication No. 2001-207877
Patent Document 4: International Publication No. WO 2005/056995
Patent Document 5: Japanese Laid-open Patent Application Publication No. 2005-105869

SUMMARY OF INVENTION

Technical Problem

However, in a case when performing advancement control of the closing timing of an exhaust valve to suppress an oil ascent during execution of a fuel-cut operation accompanied by valve stopping control of an intake valve as in the above described conventional technique, at a time of reverting from the fuel-cut operation, if the operating state of the intake valve reverts to a valve working state in a state in which the closing timing of the exhaust valve remains advanced, blowback of a large amount of in-cylinder residual gas toward an intake passage occurs.

The present invention has been conceived to solve the above described problem, and an object of the present invention is to provide a control apparatus for an internal combustion engine that can suppress blowback of in-cylinder residual gas to an intake passage when reverting from a fuel-cut operation accompanied by valve stopping control of an intake valve while also suppressing an oil ascent during execution of the fuel-cut operation, and a control apparatus for a vehicle that is equipped with the internal combustion engine.

Solution to Problem

A first aspect of the present invention is a control apparatus for an internal combustion engine, comprising:
an intake valve stop mechanism that is capable of changing an operating state of an intake valve between a valve working state and a closed-valve stopped state;
an exhaust variable valve operating apparatus that is capable of changing a valve opening characteristic of an exhaust valve;
fuel-cut operation execution means that executes a fuel-cut operation when a predetermined execution condition is established during operation of the internal combustion engine;
intake valve stopping execution means that, at a time of execution of the fuel-cut operation, executes intake valve stopping control that changes the operating state of the intake valve from the valve working state to the closed-valve stopped state;
valve-stopped-time exhaust valve control means that, at a time of execution of the intake valve stopping control, changes the valve opening characteristic of the exhaust valve so that an in-cylinder residual gas amount of gas that remains inside a cylinder when the exhaust valve is closed increases;
fuel-cut operation reversion request detection means that detects a request to revert from the fuel-cut operation; and
valve-reversion-time exhaust valve control means that, when a change of the valve opening characteristic of the exhaust valve is being performed by the valve-stopped-time exhaust valve control means in a case where a request to revert from the fuel-cut operation accompanied by the intake valve stopping control has been detected, changes the valve opening characteristic of the exhaust valve so that the in-cylinder residual gas amount decreases.

A second aspect of the present invention is the control apparatus for an internal combustion engine according to the first aspect of the present invention, further comprising:
exhaust valve control amount determination means that, at a time of execution of control by the valve-reversion-time exhaust valve control means, determines whether or not the valve opening characteristic of the exhaust valve has been controlled until the valve opening characteristic becomes a control amount that makes the in-cylinder residual gas amount less than or equal to a predetermined value; and
intake valve reversion delay execution means that, in a case where a request to revert from the fuel-cut operation accompanied by the intake valve stopping control has been detected, delays a change of the operating state of the intake valve from the closed-valve stopped state to the valve working state until it is determined that the valve opening characteristic of the exhaust valve has been controlled until the valve opening characteristic becomes the control amount by the valve-reversion-time exhaust valve control means.

A third aspect of the present invention is the control apparatus for an internal combustion engine according to the first aspect of the present invention, further comprising:

intake valve reversion execution means that, when a request to revert from the fuel-cut operation accompanied by the intake valve stopping control has been detected, changes the operating state of the intake valve from the closed-valve stopped state to the valve working state;

exhaust valve control amount determination means that, at a time of execution of control by the valve-reversion-time exhaust valve control means, determines whether or not the valve opening characteristic of the exhaust valve has been controlled until the valve opening characteristic becomes a control amount that makes the in-cylinder residual gas amount less than or equal to a predetermined value; and valve-reversion-time in-cylinder pressure control means that, when a request to revert from the fuel-cut operation accompanied by the intake valve stopping control has been detected, executes in-cylinder pressure increase inhibition control that inhibits an increase in an in-cylinder pressure at a time of combustion during a period until it is determined that the valve opening characteristic of the exhaust valve has been controlled until the valve opening characteristic becomes the control amount by the valve-reversion-time exhaust valve control means.

A fourth aspect of the present invention is the control apparatus for an internal combustion engine according to the third aspect of the present invention, wherein the in-cylinder pressure increase inhibition control is control that performs at least one of an operation to decrease a fuel injection amount, an operation to decrease a degree of opening of a throttle valve, and an operation to decrease a lift amount of the intake valve.

A fifth aspect of the present invention is the control apparatus for an internal combustion engine according to any one of the first to fourth aspects of the present invention, wherein the exhaust variable valve operating apparatus includes a phase varying mechanism capable of changing an opening/closing timing of the exhaust valve by changing a rotational phase of an exhaust camshaft relative to a rotational phase of a crankshaft, wherein the valve-stopped-time exhaust valve control means is means that, at a time of execution of the intake valve stopping control, performs advancement control of the opening/closing timing of the exhaust valve, wherein the valve-reversion-time exhaust valve control means is means that, when a request to revert from the fuel-cut operation accompanied by the intake valve stopping control has been detected, performs retardation control of the opening/closing timing of the exhaust valve, and wherein the exhaust valve control amount determination means is means that, at a time of execution of the retardation control by the valve-reversion-time exhaust valve control means, determines whether or not an advance amount of the opening/closing timing of the exhaust valve has been controlled until the advance amount becomes less than or equal to a predetermined value.

A sixth aspect of the present invention is the control apparatus for an internal combustion engine according to any one of the first to fifth aspects of the present invention, further comprising in-cylinder pressure acquisition means that detects or estimates an in-cylinder pressure, wherein, at a time of execution of the intake valve stopping control, in a case where an in-cylinder pressure when the exhaust valve is open is less than or equal to a predetermined value, the exhaust valve control amount determination means determines that the valve opening characteristic of the exhaust valve has been controlled until the valve opening characteristic becomes the control amount.

A seventh aspect of the present invention is the control apparatus for an internal combustion engine according to any one of the first to sixth aspects of the present invention, further comprising oil ascent amount estimation means that estimates an oil ascent amount that is an amount of oil that moves toward a combustion chamber side from a crank chamber side during execution of the intake valve stopping control, wherein, when the oil ascent amount is equal to or greater than a predetermined value, the valve-stopped-time exhaust valve control means performs the change of the valve opening characteristic of the exhaust valve.

An eighth aspect of the present invention is the control apparatus for an internal combustion engine according to any one of the first to seventh aspects of the present invention, wherein the oil ascent amount estimation means is means that estimates the oil ascent amount based on at least one of a number of engine revolutions, an oil temperature, a fuel-cut operation duration, and an in-cylinder pressure.

A ninth aspect of the present invention is a control apparatus for a vehicle equipped with the internal combustion engine according to any one of the first to eighth aspects of the present invention, which is a control apparatus for a vehicle that comprises a transmission that is combined with the internal combustion engine as well as the internal combustion engine, the control apparatus for a vehicle further comprising shift position detection means that detects a shift position of operation means for operating the transmission, wherein the valve-reversion-time exhaust valve control means includes mode-changing-time exhaust valve control means that, in a case where a change of the valve opening characteristic of the exhaust valve is being performed by the valve-stopped-time exhaust valve control means, when a change of the shift position from a first mode to a second mode in which a decelerating force that is greater than in the first mode is obtained is detected, changes the valve opening characteristic of the exhaust valve so that the in-cylinder residual gas amount decreases.

A tenth aspect of the present invention is the control apparatus of a vehicle equipped with the internal combustion engine according to the ninth aspect of the present invention, wherein the mode-changing-time exhaust valve control means performs a change of the valve opening characteristic of the exhaust valve within a mode changing operation time period that is previously set as a time period required for an operation of the operation means when changing from the first mode to the second mode.

Advantageous Effects of Invention

According to the first aspect of the present invention, in a case where a change of a valve opening characteristic of an exhaust valve is being performed by valve-stopped-time exhaust valve control means when a request to revert from a fuel-cut operation accompanied by the intake valve stopping control that is described above has been detected, the valve opening characteristic of the exhaust valve is changed so that an in-cylinder residual gas amount decreases. It is thereby possible to suppress blowback of in-cylinder residual gas to an intake passage when reverting from a fuel-cut operation accompanied by intake valve stopping control while suppressing an oil ascent during execution of the fuel-cut operation.

According to the second aspect of the present invention, when a request to revert from a fuel-cut operation accompanied by the intake valve stopping control that is described above has been detected, a change of the operating state of the intake valve from a closed-valve stopped state to a valve working state is delayed until it is determined that a valve opening characteristic of the exhaust valve has been controlled until the valve opening characteristic becomes the aforementioned control amount by the valve-reversion-time exhaust valve control means. It is thereby possible to suppress the occurrence of a situation in which a large amount of in-cylinder residual gas is blown back toward the intake passage at the time of reversion of the intake valve while suppressing an oil ascent during execution of the intake valve stopping control.

According to the third aspect of the present invention, when a request to revert from a fuel-cut operation accompanied by the intake valve stopping control that is described above has been detected, the aforementioned in-cylinder pressure increase inhibition control is executed during a period until it is determined that the valve opening characteristic of the exhaust valve has been controlled until the valve opening characteristic becomes the aforementioned control amount by the valve-reversion-time exhaust valve control means. By using the aforementioned in-cylinder pressure increase inhibition control to inhibit an increase in the in-cylinder pressure at a time of combustion during an initial period of reversion in which control by the aforementioned valve-reversion-time exhaust valve control means has not progressed sufficiently, it is possible to reduce an in-cylinder residual gas amount that is blown back toward the intake passage at a time of reversion of the intake valve while suppressing an oil ascent during execution of the intake valve stopping control.

According to the fourth aspect of the present invention, an increase in an in-cylinder pressure at a time of combustion can be favorably inhibited during an initial period of reversion from a fuel-cut operation, based on at least one of a decrease in a fuel injection amount, a decrease in a degree of opening of a throttle valve, and a decrease in a lift amount of an intake valve.

According to the fifth aspect of the present invention, the advantageous effects of the above described first to third aspects of the present invention can be obtained in a configuration that, using an exhaust variable valve operating apparatus equipped with the aforementioned phase varying mechanism, performs advancement control of the opening/closing timing of an exhaust valve during execution of intake valve stopping control and performs retardation control of the opening/closing timing of the exhaust valve when a request to revert from a fuel-cut operation is detected.

According to the sixth aspect of the present invention, when executing the intake valve stopping control, it is possible to determine whether or not the valve opening characteristic of the exhaust valve has been controlled until the valve opening characteristic becomes the control amount, based on an in-cylinder pressure when the exhaust valve is open.

According to the seventh aspect of the present invention, when executing a fuel-cut operation accompanied by intake valve stopping control, under circumstances in which an estimated value of an oil ascent amount is less than the aforementioned predetermined value, the above described change of the valve opening characteristic of the exhaust valve is not executed by the valve-stopped-time exhaust valve control means. Thus, under circumstances in which the oil ascent amount is less than the aforementioned predetermined value, it is possible to prepare so as to be able to rapidly respond to a request to revert from a fuel-cut operation without a problem arising due to a response delay caused by the change of the valve opening characteristic of the exhaust valve by the aforementioned valve-stopped-time exhaust valve control means when reverting from the fuel-cut operation. Therefore, according to the present invention, the number of cases in which the aforementioned response delay occurs can be reduced to a necessary minimum.

According to the eighth aspect of the present invention, it is possible to accurately estimate an oil ascent amount based on at least one of the number of engine revolutions, the oil temperature, the fuel-cut operation duration, and the in-cylinder pressure.

According to the ninth aspect of the present invention, when a change of a shift position from a first mode to a second mode has been detected in a case where the aforementioned change of the valve opening characteristic of the exhaust valve is executed by the valve-stopped-time exhaust valve control means, a change of the valve opening characteristic of the exhaust valve so as to reduce an in-cylinder residual gas amount is executed in advance of detection of an actual reversion request. It is thereby possible to proceed with the aforementioned change of the valve opening characteristic of the exhaust valve that is a change for after reversion from a fuel-cut operation, by utilizing the time that is required for a driver to operate the aforementioned operation means. Therefore, according to the present invention, when a request to revert from a fuel-cut operation is actually made after the switching of a transmission mode as described above, reversion from the fuel-cut operation can be executed immediately without being affected by a response delay relating to a change of the valve opening characteristic of the exhaust valve, and the driver can be prevented from feeling that there is an acceleration lag.

According to the tenth aspect of the present invention, the aforementioned change of the valve opening characteristic of the exhaust valve that is a change for after reversion from a fuel-cut operation can be completed in advance by utilizing the above described mode changing operation time period.

DESCRIPTION OF EMBODIMENTS

Embodiment 1

[Description of System Configuration]

Figure 1:
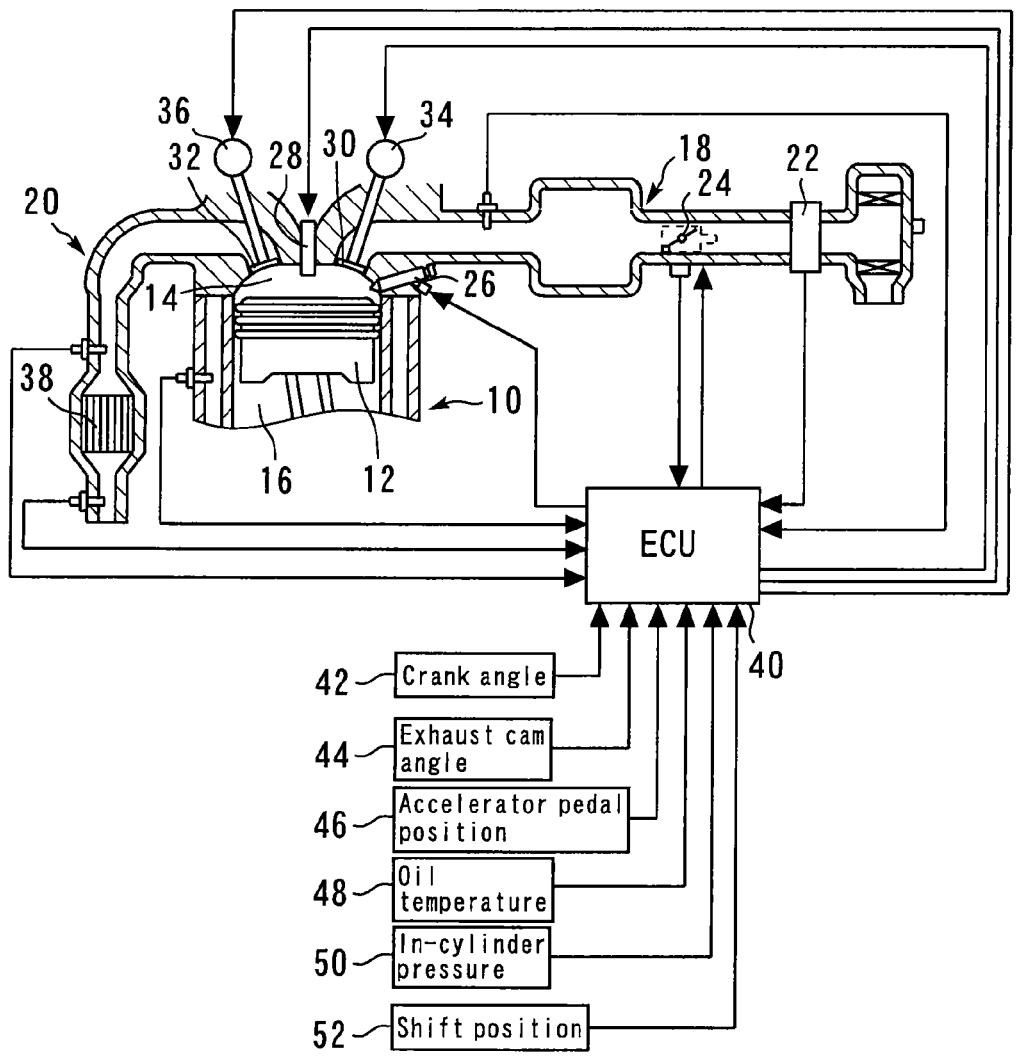
FIG. 1 is a view for describing the system configuration of a control apparatus for a vehicle provided with an internal combustion engine according to Embodiment 1 of the present invention.

FIG. 1 is a view for describing the system configuration of a control apparatus for a vehicle provided with an internal combustion engine according to Embodiment 1 of the present invention.

The system of the present embodiment includes a spark-ignition internal combustion engine (gasoline engine) 10. According to the present embodiment, as one example, the internal combustion engine 10 is an in-line four-cylinder engine that has four cylinders #1 to #4.

A piston 12 is provided in each cylinder of the internal combustion engine 10. A combustion chamber 14 is formed at the top side of the piston 12 in each cylinder of the internal combustion engine 10, and a crank chamber 16 is formed on the lower side of the piston 12. An intake passage 18 and an exhaust passage 20 communicate with the combustion chamber 14.

An air flow meter 22 that outputs a signal in accordance with the flow rate of air that is drawn into the intake passage 18 is provided in the vicinity of an inlet of the intake passage 18. A throttle valve 24 is provided downstream of the air flow meter 22. The throttle valve 24 is an electronically controlled throttle valve that can control a degree of throttle opening independently of a position of an accelerator pedal.

An in-cylinder fuel injection valve 26 for injecting fuel directly into the combustion chamber 14 (into the cylinder) is provided in a cylinder head included in the internal combustion engine 10. A spark plug 28 is also provided in the cylinder head included in the internal combustion engine 10. The spark plug 28 is arranged so as to protrude into the combustion chamber 14 from the top of the combustion chamber 14. An intake valve 30 and an exhaust valve 32 are provided in an intake port and an exhaust port, respectively. The intake valve 30 and the exhaust valve 32 are used to place the combustion chamber 14 and the intake passage 18, or the combustion chamber 14 and the exhaust passage 20 in a connecting state or a cut-off state, respectively.

The intake valve 30 is driven by an intake variable valve operating apparatus 34. The intake variable valve operating apparatus 34 has an intake valve stop mechanism that is capable of changing the operating state of the intake valve 30 between a valve working state and a closed-valve stopped state in cylinder units. A specific configuration that realizes the intake valve stop mechanism is not particularly limited. For example, a configuration can be used that, using a switching pin, is capable of halting a rocking action of a rocker arm that transmits an acting force of a cam to a valve. Herein, in the following description, control that switches the operating state of the intake valve 30 from a valve working state to a closed-valve stopped state is referred to as "intake valve stopping control".

Figure 2:
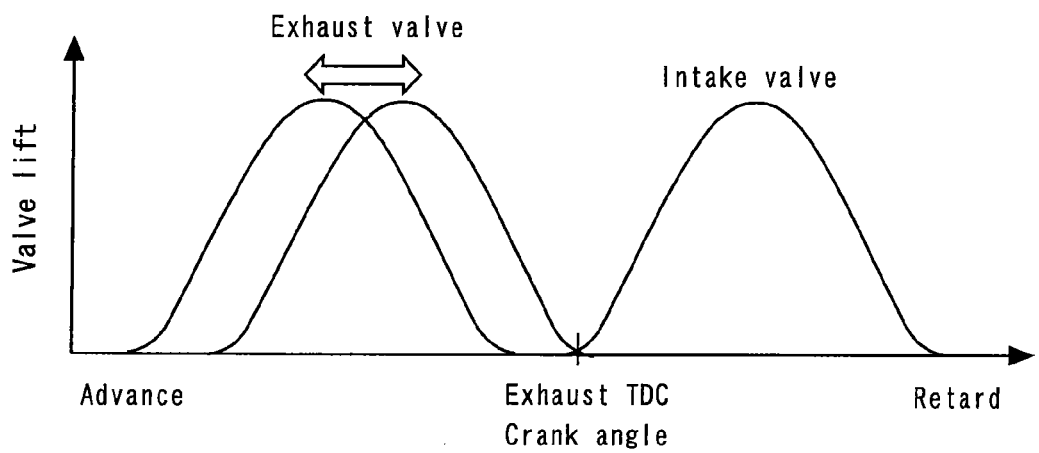
FIG. 2 is a valve lift graph that illustrates the manner in which the opening/closing timing of an exhaust valve is controlled by an exhaust variable valve operating apparatus shown in FIG. 1.

FIG. 2 is a valve lift graph that illustrates the manner in which the opening/closing timing of the exhaust valve 32 is controlled by the exhaust variable valve operating apparatus 36 shown in FIG. 1.

The exhaust variable valve operating apparatus 36 that drives the exhaust valve 32 includes a phase varying mechanism (VVT (variable valve timing) mechanism) that can vary the opening/closing timing of the exhaust valve 32 by changing a rotational phase of an exhaust camshaft (not shown) relative to a rotational phase of a crankshaft (not shown). As shown in FIG. 2, an advance amount of the opening/closing timing of the exhaust valve 32 can be adjusted by the exhaust variable valve operating apparatus 36 that has such kind of phase varying mechanism.

Further, as shown in FIG. 1, a catalyst 38 for purifying exhaust gas is disposed in the exhaust passage 20. The system shown in FIG. 1 also includes an ECU (Electronic Control Unit) 40. Various sensors for detecting the operating state of the internal combustion engine 10 such as, in addition to the aforementioned air flow meter 22, a crank angle sensor 42 for detecting the number of engine revolutions, an exhaust cam angle sensor 44 for detecting an advance amount of the opening/closing timing of the exhaust valve 32, an accelerator pedal position sensor 46 for detecting a position of the accelerator pedal of the vehicle, an oil temperature sensor 48 for detecting the temperature of oil that lubricates the internal combustion engine 10, and an in-cylinder pressure sensor 50 for detecting an in-cylinder pressure are connected to an input side of the ECU 40. The various actuators described above are connected to an output side of the ECU 40. The ECU 40 can control the operating state of the internal combustion engine 10 based on the outputs of these sensors.

Furthermore, the vehicle in which the internal combustion engine 10 is mounted includes a transmission (not shown in the drawings) that is combined with the internal combustion engine 10. In this case, it is assumed that an automatic transmission that has transmission modes including a drive mode (D mode) and a brake mode (B mode) is used as the transmission. The D mode is a mode in which automatic gear shifting is performed. The B mode is a mode that is set so as to obtain a greater decelerating force than when the D mode is used. In this case, as one example of the B mode, it is assumed that a mode is used that is fixed at a gear speed of a higher reduction gear ratio than a gear speed on a high speed side among a plurality of gear speeds that are used when the D mode is selected (for example, in a case where switching is performed over five gear speeds that consist of a first to a fifth speed in the D mode, it is assumed that a mode that is fixed to the second speed is provided as the B mode). The system of the present embodiment also includes a shift position sensor 52 for detecting a shift position of a shift lever (operation means) for switching a transmission mode of the aforementioned transmission. The shift position sensor 52 is connected to the ECU 40.

[Issues when Reverting from a Fuel-Cut Operation Accompanied by Intake Valve Stopping Control]

If fresh air that has a high oxygen concentration is supplied to the catalyst 38 disposed in the exhaust passage 20 when the catalyst 38 is in a high-temperature state, there is a concern that deterioration will occur in the catalyst 38. According to the system of the present embodiment that includes the above described intake variable valve operating apparatus 34, when a request to execute a fuel-cut operation is made at a time of deceleration or the like, fresh air can be prevented from flowing into the catalyst 38 during a fuel-cut operation by performing valve stopping control (intake valve stopping control) with respect to the intake valve 30.

However, when the intake valve 30 is placed in a closed-valve stopped state during execution of a fuel-cut operation, a large negative pressure is generated inside the cylinder (inside the combustion chamber 14). As a result, a phenomenon (a so-called "oil ascent") occurs in which oil that adheres to the cylinder wall surface moves from the crank chamber 16 side toward the combustion chamber 14 side. According to the present embodiment, to suppress the occurrence of such an oil ascent, a configuration is adopted that performs advancement control of the opening/closing timing of the exhaust valve 32 during execution of a fuel-cut operation that is accompanied by intake valve stopping control. According to this advancement control of the opening/closing timing of the exhaust valve 32, by advancing the closing timing of the exhaust valve 32 that would normally be a timing in the vicinity of the exhaust top dead center, the amount of gas (hereunder, referred to as "in-cylinder residual gas") that remains in the cylinder (in the combustion chamber 14) when the exhaust valve 32 is closed can be increased. It is thereby possible to avoid a situation in which a large negative pressure is generated inside the cylinder during intake valve stopping control, and suppress an oil ascent.

However, when performing advancement control of the closing timing of the exhaust valve 32 as described above to suppress an oil ascent during execution of a fuel-cut operation accompanied by intake valve stopping control, at a time of reverting from the fuel-cut operation, if the operating state of the intake valve 30 reverts to the valve working state in a state in which the closing timing of the exhaust valve 32 remains advanced, blowback of a large amount of in-cylinder residual gas toward the intake passage 18 occurs. As a result, the accumulation of deposits at a port section of the intake passage 18 is promoted. In addition, when reverting from a fuel-cut operation, if the operating state of the intake valve 30 reverts to the valve working state in a state in which the closing timing of the exhaust valve 32 remains advanced and the opening timing thereof also remains advanced, gas that has a high temperature and a high pressure that is in the process of being combusted inside the combustion chamber 14 flows out forcefully toward the exhaust passage 20 when the exhaust valve 32 is opened. Consequently, there is a concern that noise caused by an exhaust shock wave or damage to the catalyst 38 will occur.

[Characteristic Control of Embodiment 1 when Reverting from a Fuel-Cut Operation]

Figure 3:
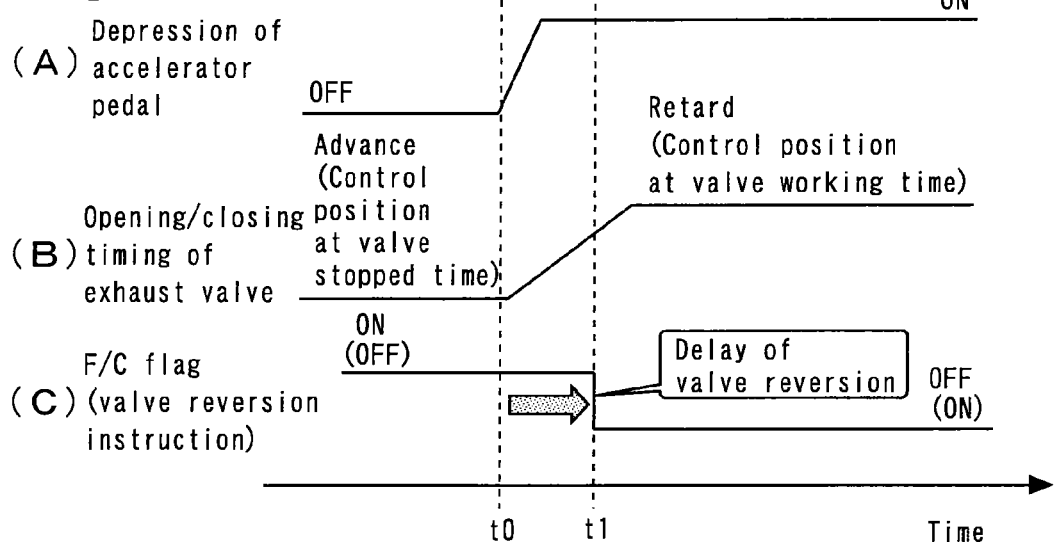
FIG. 3 is a time chart for describing characteristic control according to Embodiment 1 of the present invention.

FIG. 3 is a time chart for describing characteristic control according to Embodiment 1 of the present invention. More specifically, FIG. 3(A) shows a waveform that represents on and off states with respect to depression of an accelerator pedal, FIG. 3(B) shows a waveform that represents control positions of the opening/closing timing of the exhaust valve 32, and FIG. 3(C) shows a waveform that represents on and off states of a fuel-cut operation (F/C) flag (valve reversion instruction).

A state before a time point t0 shown in FIG. 3 is a state in which, during deceleration in which the accelerator pedal is in an "off" state, a fuel-cut operation accompanied by intake valve stopping control is being executed and, further, the above described advancement control of the opening/closing timing of the exhaust valve 32 for suppressing an oil ascent is being executed. According to the present embodiment a configuration is adopted so that, when the vehicle is in the above described state, if depression of the accelerator pedal is detected at the time point t0 as shown in FIG. 3(A) (if an acceleration request of a driver is detected), it is determined that a request has been made to revert from the fuel-cut operation that is accompanied by the intake valve stopping control.

According to the present embodiment, even in a case where the aforementioned reversion request is detected at the time point t0, reversion from the intake valve stopping control is not performed immediately. Instead, as shown in FIG. 3(B), first, retardation control is executed to return the opening/closing timing of the exhaust valve 32 that had been subjected to the advancement control for suppressing an oil ascent to a position for a time when the valve is working.

Subsequently, according to the present embodiment, at a time point t1 at which the opening/closing timing of the exhaust valve 32 has been retarded as far as a control amount at which it can be determined that the influence of the blowback of in-cylinder residual gas to the intake passage 18 has disappeared, as shown in FIG. 3(C), reversion from the fuel-cut operation that is accompanied by reversion from the intake valve stopping control is executed. Thus, according to the present embodiment, when a request is made to revert from a fuel-cut operation, reversion of the intake valve 30 to the valve working state is delayed (prohibited) until the opening/closing timing of the exhaust valve 32 is retarded as far as the above described control amount.

Figure 4:
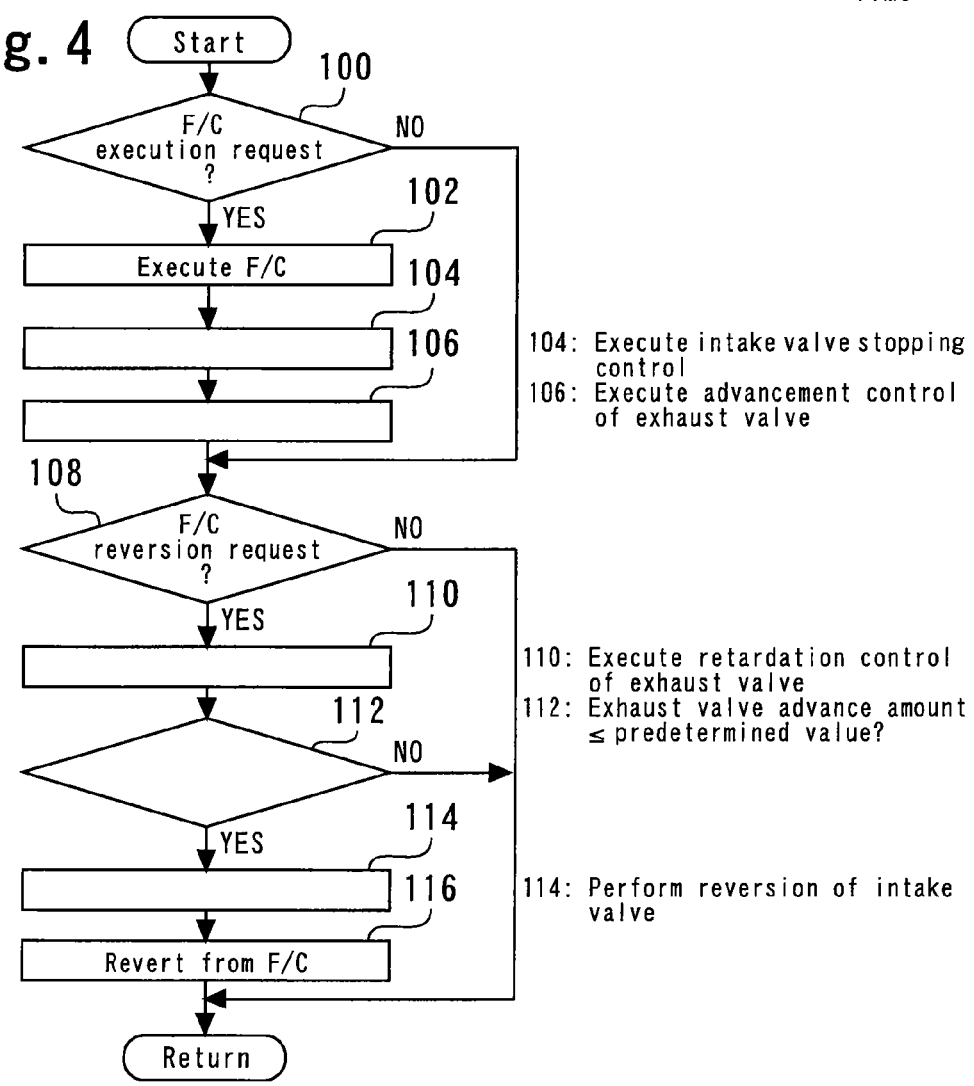
FIG. 4 is a flowchart of a routine that is executed in Embodiment 1 of the present invention.

FIG. 4 is a flowchart that illustrates a control routine that the ECU 40 executes according to Embodiment 1 to implement the above described functions. In this connection, the processing of the present routine is repeatedly executed for each predetermined control period.

According to the routine shown in FIG. 4, first, based on the output of the accelerator pedal position sensor 46 and the like, the ECU 40 determines whether or not there is a request to execute a fuel-cut operation (F/C) (step 100).

If the ECU 40 determines as a result that there is a request to execute a fuel-cut operation, the fuel-cut operation is executed (step 102), and intake valve stopping control is also executed (step 104). Next, to suppress an oil ascent, advancement control of the opening/closing timing of the exhaust valve 32 is executed (step 106).

Subsequently, based on a determination as to whether or not the accelerator pedal has been depressed or the like, the ECU 40 determines whether or not there is a request to revert from the fuel-cut operation (step 108). If the ECU 40 determines as a result that there is a request to revert from the fuel-cut operation, the ECU 40 executes retardation control of the opening/closing timing of the exhaust valve 32 to decrease the in-cylinder residual gas amount (step 110).

Thereafter, the ECU 40 determines whether or not an advance amount of the opening/closing timing of the exhaust valve 32 is less than or equal to a predetermined value (step 112). The predetermined value of the opening/closing timing of the exhaust valve 32 in the present step 112 is a value that is previously set as a threshold value for determining whether or not there is an influence of blowback of in-cylinder residual gas to the intake passage 18. If the result determined in the present step 112 is still not affirmative, the ECU 40 determines that retardation of the opening/closing timing of the exhaust valve 32 is not sufficient with respect to the above described blowback of in-cylinder residual gas, and prohibits reversion from the intake valve stopping control.

In contrast, if the result determined in the aforementioned step 112 is affirmative, the ECU 40 determines that retardation of the opening/closing timing of the exhaust valve 32 has been sufficiently performed with respect to the above described blowback of in-cylinder residual gas. In this case, the ECU 40 executes processing that causes the operating state of the intake valve 30 to revert to the valve working state during execution of the intake valve stopping control (step 114), and also executes reversion from the fuel-cut operation (that is, resumption of fuel injection) (step 116).

According to the routine shown in FIG. 4 that is described above, when a request to revert from a fuel-cut operation is made, the opening/closing timing of the exhaust valve 32 is retarded toward a control position at which it can be determined that the aforementioned influence of blowback of in-cylinder residual gas has disappeared. Further, reversion of the intake valve 30 to the valve working state is delayed (prohibited) until the opening/closing timing of the exhaust valve 32 is retarded to the relevant control position. It is thereby possible to suppress the occurrence of a situation in which a large amount of in-cylinder residual gas is blown back toward the intake passage 18 at a time of reversion of the intake valve 30 while also suppressing an oil ascent during execution of the intake valve stopping control. Further, the occurrence of noise caused by an exhaust shock wave or of damage to the catalyst 38 can be prevented.

According to the above described Embodiment 1, a configuration is adopted so as to retard the opening/closing timing of the exhaust valve 32 using the phase varying mechanism provided in the exhaust variable valve operating apparatus 36 to suppress an oil ascent when executing the intake valve stopping control. However, in the present invention, a change of a valve opening characteristic of an exhaust valve that is performed when executing the intake valve stopping control is not limited to a change that is performed by the aforementioned technique. More specifically, it is sufficient that the change of the valve opening characteristic of the exhaust valve in this case is control that is performed so that, during execution of the intake valve stopping control, an in-cylinder residual gas amount that remains in the cylinder when the exhaust valve is closed increases. For example, in a case where an exhaust variable valve operating apparatus that is capable of changing a closing timing of an exhaust valve independently of the opening timing thereof is provided, a technique may be employed that, in comparison to a control position in the valve working state, adjusts only the closing timing of the exhaust valve to an advanced side or a retarded side relative to the exhaust top dead center.

Further, in the above described Embodiment 1, a configuration is adopted so that, when a request to revert from a fuel-cut operation accompanied by valve stopping control is detected, reversion of the intake valve 30 to the valve working state is delayed (prohibited) until an advance amount of the opening/closing timing of the exhaust valve 32 is equal to or less than the above described predetermined value. However, the present invention is not limited thereto. More specifically, for example, in a case where the in-cylinder pressure sensor 50 for detecting an in-cylinder pressure is provided, as in the configuration of the internal combustion engine 10 shown in FIG. 1, a configuration may be adopted that, when the above described reversion request is detected, delays reversion of the intake valve to the valve working state until the in-cylinder pressure when the exhaust valve is open becomes less than or equal to a predetermined value for determining whether or not there is an influence of blowback of in-cylinder residual gas to the intake passage.

Note that, in the above described Embodiment 1, the intake valve stop mechanism included in the intake variable valve operating apparatus 34 corresponds to the "intake valve stop mechanism" in the above described first aspect of the present invention. Further, "fuel-cut operation execution means" according to the first aspect of the present invention is realized by the ECU 40 executing the processing of the above described step 102, "intake valve stopping execution means" according to the first aspect of the present invention is realized by the ECU 40 executing the processing of the above described step 104, "valve-stopped-time exhaust valve control means" according to the first aspect of the present invention is realized by the ECU 40 executing the processing of the above described step 106, "fuel-cut operation reversion request detection means" according to the first aspect of the present invention is realized by the ECU 40 executing the processing of the above described step 108, and "valve-reversion-time exhaust valve control means" according to the above described seventh aspect of the present invention is realized by the ECU 40 executing the processing of the above described step 110.

In addition, "exhaust valve control amount determination means" according to the above described second aspect of the present invention is realized by the ECU 40 executing the processing of the above described step 112, and "intake valve reversion delay execution means" according to the second aspect of the present invention is realized by the ECU 40 executing the series of processing of the above described steps 108 to 116 in the order of the routine shown in the above described FIG. 4.

Furthermore, the in-cylinder pressure sensor 50 corresponds to "in-cylinder pressure acquisition means" according to the above described sixth aspect of the present invention.

Embodiment 2

Figure 5:
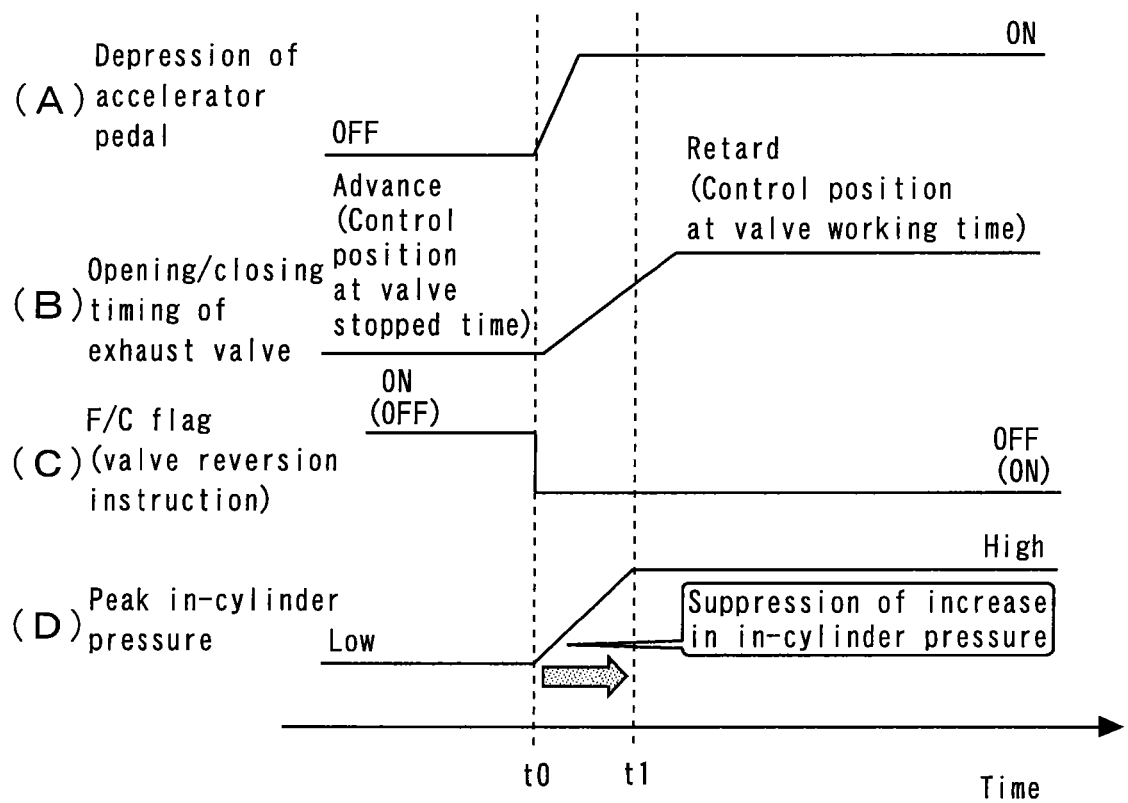
FIG. 5 is a time chart for describing characteristic control according to Embodiment 2 of the present invention.
Figure 6:
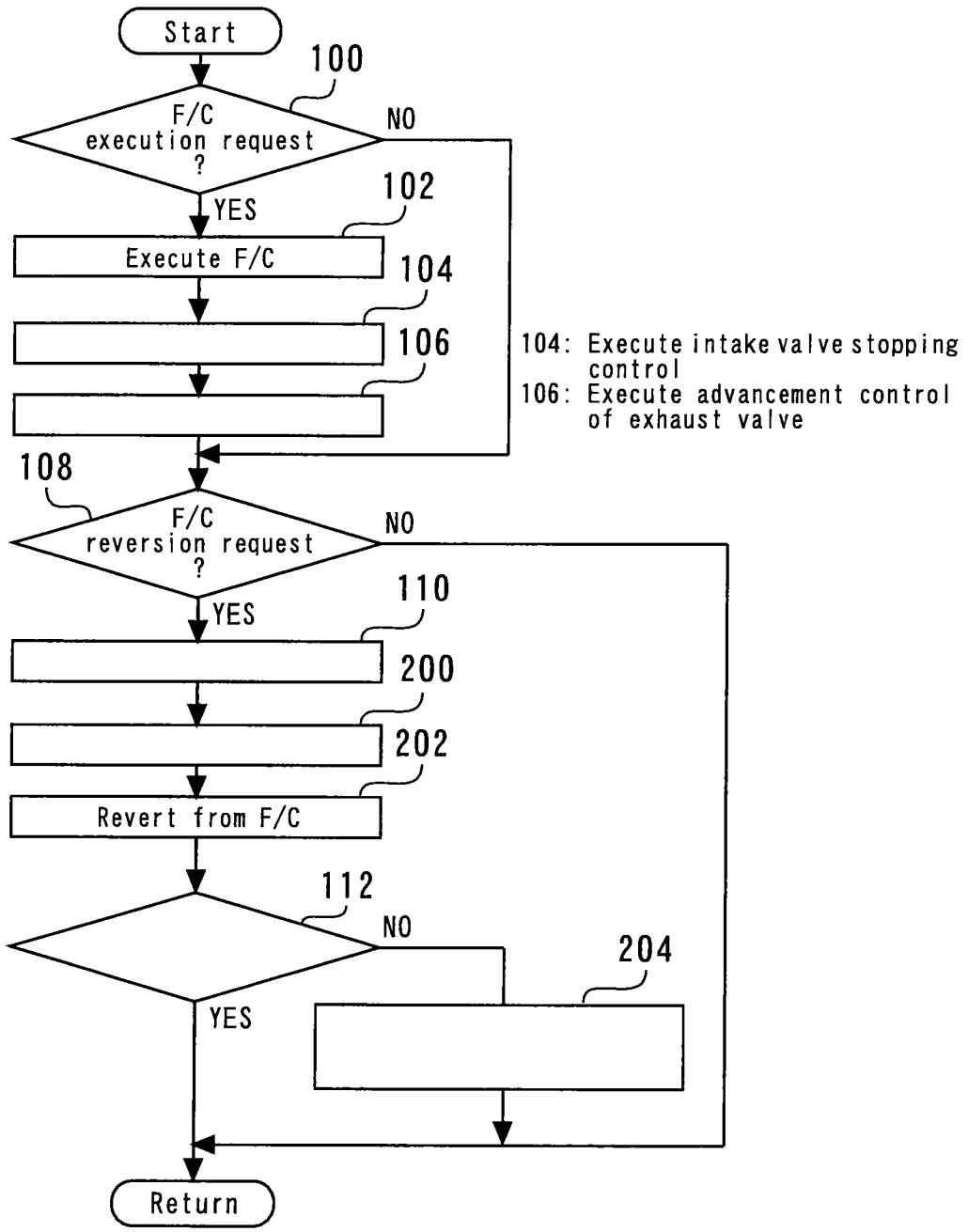
FIG. 6 is a flowchart of a routine that is executed in Embodiment 2 of the present invention.

Next, Embodiment 2 of the present invention is described referring to FIG. 5 and FIG. 6.

The system of the present embodiment can be realized by causing the ECU 40 to execute a routine shown in FIG. 6 that is described later instead of the routine shown in FIG. 4, using the hardware configuration shown in FIG. 1.

FIG. 5 is a time chart for describing characteristic control according to Embodiment 2 of the present invention. More specifically, similarly to FIGS. 3(A) to (C), FIGS. 5(A) to (C) show waveforms that correspond to depression of an accelerator pedal, control positions of the opening/closing timing of the exhaust valve 32, and an F/C flag (valve reversion instruction), respectively. Further, FIG. 5(D) shows a waveform that represents changes in a peak value of an in-cylinder pressure (peak in-cylinder pressure) during one cycle of the internal combustion engine 10.

As shown in FIGS. 5(A) and 5(B), the control of the present embodiment is the same as the control of the above described Embodiment 1 in the respect that when depression of the accelerator pedal (a request to revert from a fuel-cut operation) is detected, retardation control is executed to return the opening/closing timing of the exhaust valve 32 that had been subjected to advancement control for suppression of an oil ascent to a position for a time when the valve is working. However, as shown in FIG. 5(C), the control of the present embodiment differs from the control of Embodiment 1 in the respect that, at the time point t0 at which depression of the accelerator pedal (a request to revert from a fuel-cut operation) is detected, reversion from the fuel-cut operation that is accompanied by reversion from intake valve stopping control is immediately executed.

Further, a feature of the present embodiment is that, during a period from the time point t0 to the time point t1 (time point at which the opening/closing timing of the exhaust valve 32 has been retarded as far as a control amount at which it can be determined that the influence of blowback of in-cylinder residual gas to the intake passage 18 has disappeared), as shown in FIG. 5(D), control is executed for inhibiting an increase in an in-cylinder pressure at a time of combustion after reversion from a fuel-cut operation. The aforementioned in-cylinder pressure increase inhibition control can be realized, for example, by decreasing a fuel injection amount, or by decreasing an intake air amount by decreasing the degree of throttle opening. In this connection, in the case of a configuration equipped with a lift varying mechanism that makes it possible to vary a lift amount of the intake valve 30, an increase in the in-cylinder pressure may be inhibited by decreasing the intake air amount by decreasing the lift amount of the intake valve 30.

More specifically, according to the in-cylinder pressure increase inhibition control, a fuel injection amount or an intake air amount is decreased so as to obtain a rather low in-cylinder pressure (torque) during an initial stage of valve reversion during a period from the aforementioned time point t0 to the time point t1. Further, as shown in FIGS. 5(B) and 5(D), as retardation of the opening/closing timing of the exhaust valve 32 progresses, adjustment of the fuel injection amount and the intake air amount is performed so that the in-cylinder pressure (torque) gradually rises.

FIG. 6 is a flowchart that illustrates a control routine that the ECU 40 executes according to Embodiment 2 to implement the above described functions. In this connection, the processing of the present routine is repeatedly executed for each predetermined control period. Further, in FIG. 6, steps that are the same as steps shown in FIG. 4 with respect to Embodiment 1 are denoted by the same reference numerals, and a description of those steps is omitted or simplified below.

In the routine shown in FIG. 6, if it is determined in the above described step 108 that there is a request to revert from a fuel-cut operation, retardation control of the opening/closing timing of the exhaust valve 32 is executed to decrease the in-cylinder residual gas amount (step 110). Thereafter, processing to revert from the intake valve stopping control is executed (step 200), and processing to revert from the fuel-cut operation (that is, resumption of fuel injection) is also executed (step 202).

Next, in the above described step 112, the ECU 40 determines whether or not an advance amount of the opening/closing timing of the exhaust valve 32 is less than or equal to the aforementioned predetermined value. If the result determined in the present step 112 is still not affirmative, the ECU 40 executes the above described in-cylinder pressure increase inhibition control (step 204). In contrast, when the result determined in step 112 is affirmative, the above described in-cylinder pressure increase inhibition control is ended.

According to the routine shown in FIG. 6 that is described above, when a request to revert from a fuel-cut operation is made, the opening/closing timing of the exhaust valve 32 is retarded to a control position at which it can be determined that the aforementioned influence of blowback of in-cylinder residual gas has disappeared. Further, upon the execution of processing to revert from the intake valve stopping control accompanying a request to revert from a fuel-cut operation, the above described in-cylinder pressure increase inhibition control is executed until the opening/closing timing of the exhaust valve 32 is retarded to the relevant control position. By inhibiting an increase in the in-cylinder pressure at a time of combustion during an initial period of reversion in which the opening/closing timing of the exhaust valve 32 is not sufficiently retarded by the above described control, it is possible to reduce an in-cylinder residual gas amount that is blown back toward the intake passage 18 at the time of reversion of the intake valve 30 while suppressing an oil ascent during execution of the intake valve stopping control. Further, the occurrence of noise caused by an exhaust shock wave or of damage to the catalyst 38 can be lessened.

In the above described Embodiment 2, when a request to revert from a fuel-cut operation that is accompanied by valve stopping control is detected, the in-cylinder pressure increase inhibition control is executed until an advance amount of the opening/closing timing of the exhaust valve 32 becomes less than or equal to the aforementioned predetermined value. However, the present invention is not limited thereto. More specifically, for example, in a case where the in-cylinder pressure sensor 50 for detecting an in-cylinder pressure is provided, as in the configuration of the internal combustion engine 10 shown in FIG. 1, a configuration may be adopted that, when the above described reversion request is detected, executes the aforementioned in-cylinder pressure increase inhibition control until the in-cylinder pressure when the exhaust valve is open becomes less than or equal to a predetermined value for determining whether or not there is an influence of blowback of in-cylinder residual gas to the intake passage.

Note that, in the above described Embodiment 2, "intake valve reversion execution means" according to the above described third aspect of the present invention is realized by the ECU 40 executing the processing of the above described step 200, "exhaust valve control amount determination means" according to the third aspect of the present invention is realized by the ECU 40 executing the processing of the above described step 112, and "valve-reversion-time in-cylinder pressure control means" according to the third aspect of the present invention is realized by the ECU 40 executing the series of processing of the above described steps 110, 112, and 200 to 204 in the order of the routine shown in FIG. 6 that is described above.

Embodiment 3

Figure 7:
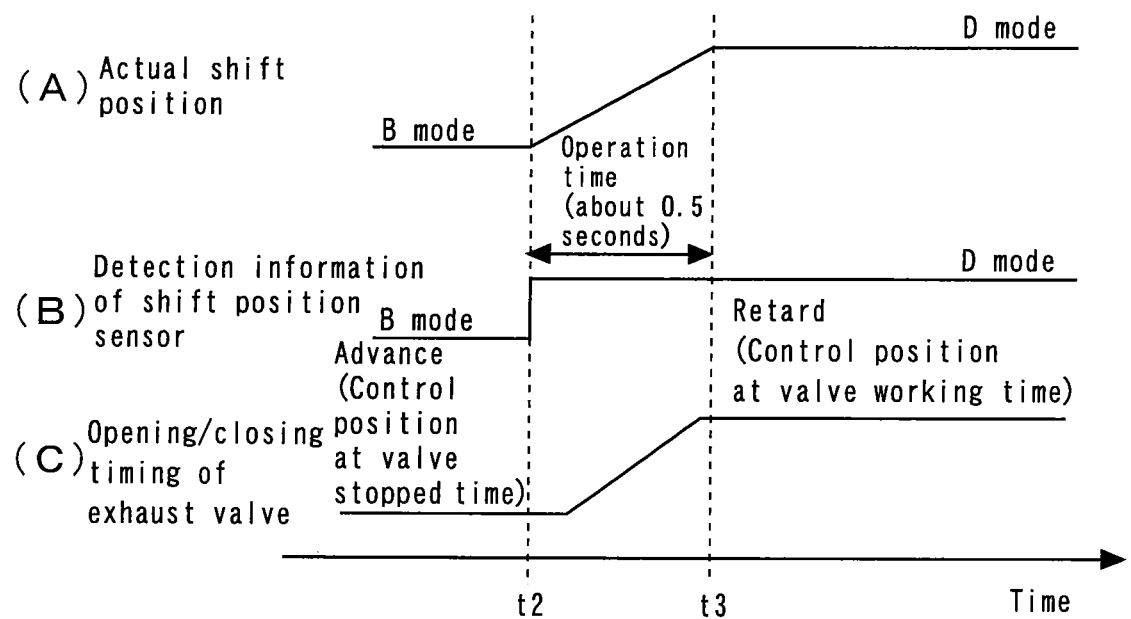
FIG. 7 is a time chart for describing characteristic control according to Embodiment 3 of the present invention.
Figure 8:
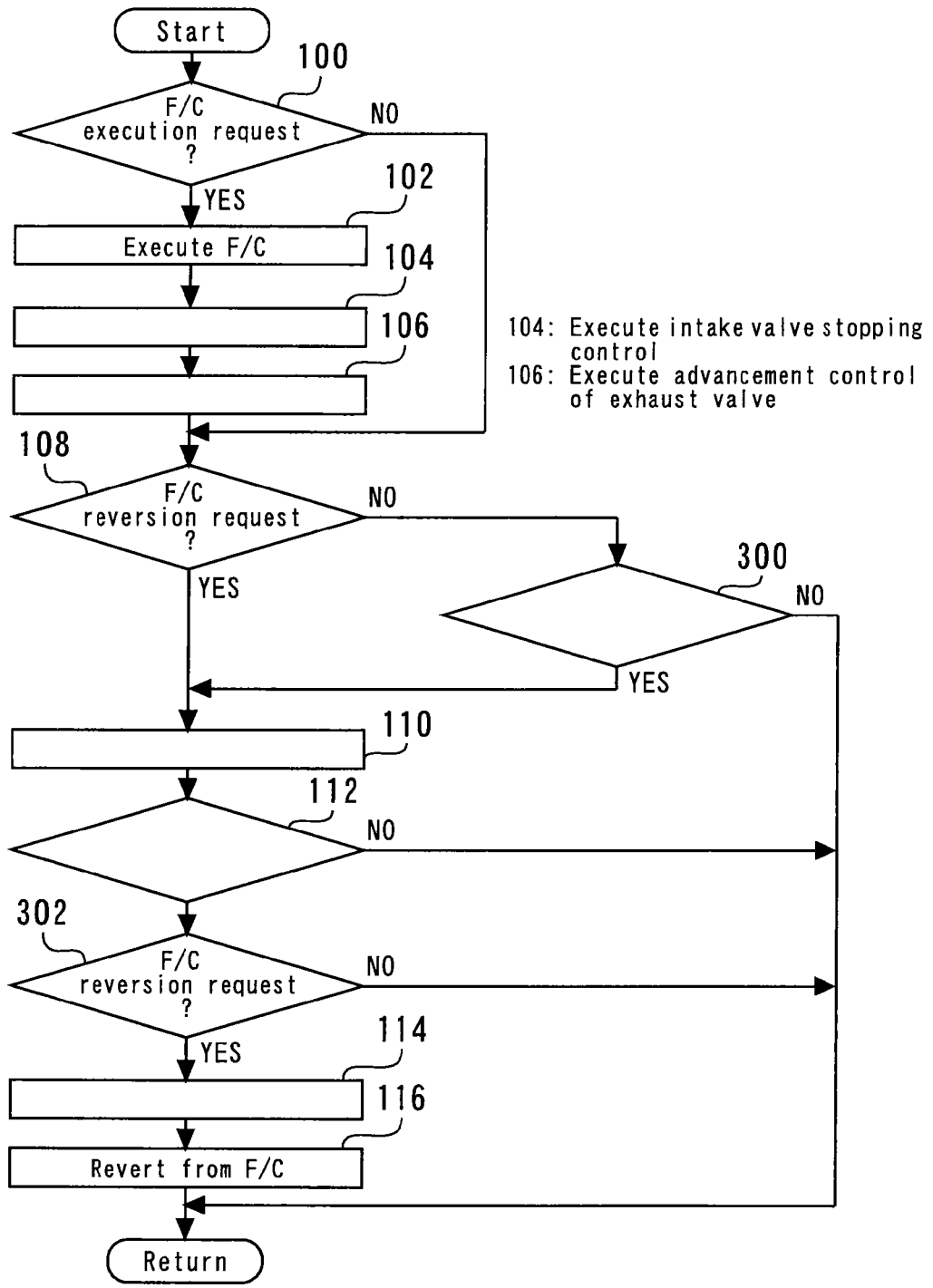
FIG. 8 is a flowchart of a routine that is executed in Embodiment 3 of the present invention.

Next, Embodiment 3 of the present invention is described referring to FIG. 7 and FIG. 8.

The system of the present embodiment can be realized by causing the ECU 40 to execute a routine shown in FIG. 8 that is described later instead of the routine shown in FIG. 4, using the hardware configuration shown in FIG. 1.

FIG. 7 is a time chart for describing characteristic control according to Embodiment 3 of the present invention. More specifically, FIG. 7(A) shows a waveform that represents actual shift positions of the shift lever, FIG. 7(B) shows a waveform that represents detection information of the shift position sensor 52, and FIG. 7(C) shows a waveform that represents control positions of the opening/closing timing of the exhaust valve 32. In this connection, it is assumed that the situation illustrated in FIG. 7 is a state in which depression of the accelerator pedal is not being performed (that is, a state in which a request is not being made to revert from a fuel-cut operation).

As described in the foregoing Embodiments 1 and 2, an oil ascent can be suppressed by advancing the opening/closing timing of the exhaust valve 32 when executing a fuel-cut operation that is accompanied by intake valve stopping control. When a mechanism that utilizes oil pressure or the like as a driving force is being used as the above described phase varying mechanism of the exhaust variable valve operating apparatus 36, there is a response delay of a certain amount when the opening/closing timing of the exhaust valve 32 is changed. Therefore, when reverting from a fuel-cut operation, there is a problem that a delay arises in the build-up of torque of the internal combustion engine 10 (a feeling of an acceleration lag arises) due to the above described response delay of the phase varying mechanism that occurs when returning the opening/closing timing of the exhaust valve 32 that had been retarded up to that time to a position for a time when the valve is working.

On the other hand, as shown in FIG. 7 (A), it normally takes an operation time of approximately 0.5 seconds for a driver to perform an operation to switch the shift lever from the B mode to the D mode. Further, as shown in FIG. 7(B), detection of an operation to switch the shift lever from the B mode to the D mode is possible at a time point t2 at which the shift position sensor 52 detects that the shift lever has been moved out from the B mode.

As described above, the D mode is a mode in which usage of a higher gear speed (on the high speed side) is possible compared to the B mode. Therefore, the fact that a switch from the B mode to the D mode is performed by the driver during a fuel-cut operation (during deceleration) can be determined as indicating there is a high possibility that an acceleration request will soon be made by the driver. Thus, according to the present embodiment, a configuration is adopted in which, when a switch from the B mode to the D mode is detected during a fuel-cut operation accompanied by intake valve stopping control, such a switch is regarded as indicating that a request to revert from a fuel-cut operation will soon be made and therefore, as shown in FIG. 7(C), retardation control of the opening/closing timing of the exhaust valve 32 is started first, without waiting for detection of an actual reversion request.

Further, according to the present embodiment, as shown in FIG. 7, a configuration is adopted in which a time required for the driver to operate the shift lever when changing from the B mode to the D mode is set in advance in the ECU 40 as a mode changing operation time period (for example, 0.5 seconds). Further, the exhaust variable valve operating apparatus 36 is controlled so that the aforementioned retardation control of the opening/closing timing of the exhaust valve 32 is performed within the mode changing operation time period.

FIG. 8 is a flowchart that illustrates a control routine that the ECU 40 executes according to Embodiment 3 to implement the above described functions. In this connection, the processing of the present routine is repeatedly executed for each predetermined control period. Further, in FIG. 8, steps that are the same as steps shown in FIG. 4 with respect to Embodiment 1 are denoted by the same reference numerals, and a description of those steps is omitted or simplified below.

In the routine shown in FIG. 8, if it is determined in the above described step 108 that there is not a request to revert from a fuel-cut operation, thereafter the ECU 40 determines whether or not switching of the transmission mode from the B mode to the D mode has been detected (step 300). If the result determined in the present step 300 is affirmative, the ECU 40 executes retardation control of the opening/closing timing of the exhaust valve 32 to reduce an in-cylinder residual gas amount (step 110).

Further, in the routine shown in FIG. 8, if it is determined in the above described step 112 that an advance amount of the opening/closing timing of the exhaust valve 32 is less than or equal to the aforementioned predetermined value, thereafter the ECU 40 determines once again whether or not there is a request to revert from the fuel-cut operation (an acceleration request made by depressing the accelerator pedal) (step 302). If the result determined in the present step 302 is affirmative, reversion from the fuel-cut operation (step 116) that is accompanied by reversion from the intake valve stopping control (step 114) is performed.

According to the routine shown in FIG. 8 that is described above, when a switch from the B mode to the D mode is detected during execution of a fuel-cut operation accompanied by intake valve stopping control, it is determined that a request to revert from the fuel-cut operation will soon be made, and retardation control of the opening/closing timing of the exhaust valve 32 is executed in advance of the detection of an actual reversion request. According to this control, it is possible to complete the retardation control of the opening/closing timing of the exhaust valve 32 that is control for after reversion from a fuel-cut operation in advance by utilizing the time period (mode changing operation time period) required for operation of the shift lever by the driver. Therefore, when a request to revert from a fuel-cut operation is actually made after the above described switching of the transmission mode, reversion from the fuel-cut operation can be executed immediately without being affected by a response delay of the retardation control of the opening/closing timing of the exhaust valve 32. Consequently, the driver can be prevented from feeling that there is an acceleration lag.

In Embodiment 3 that is described above, a configuration is adopted in which the control of the present embodiment is combined with control of the above described Embodiment 1 (see FIG. 4). However, a configuration may be adopted in which the control of the present embodiment is combined with control of the above described Embodiment 2 (see FIG. 6) instead of the control of Embodiment 1.

Note that, in the foregoing Embodiment 3, "shift position detection means" according to the above described ninth aspect of the present invention is realized by the ECU 40 executing the processing of the aforementioned step 300, and "mode-changing-time exhaust valve control means" according to the ninth aspect of the present invention is realized by the ECU 40 executing the processing of the aforementioned step 110 when the result determined in the aforementioned step 300 is affirmative.

Embodiment 4

Figure 9:
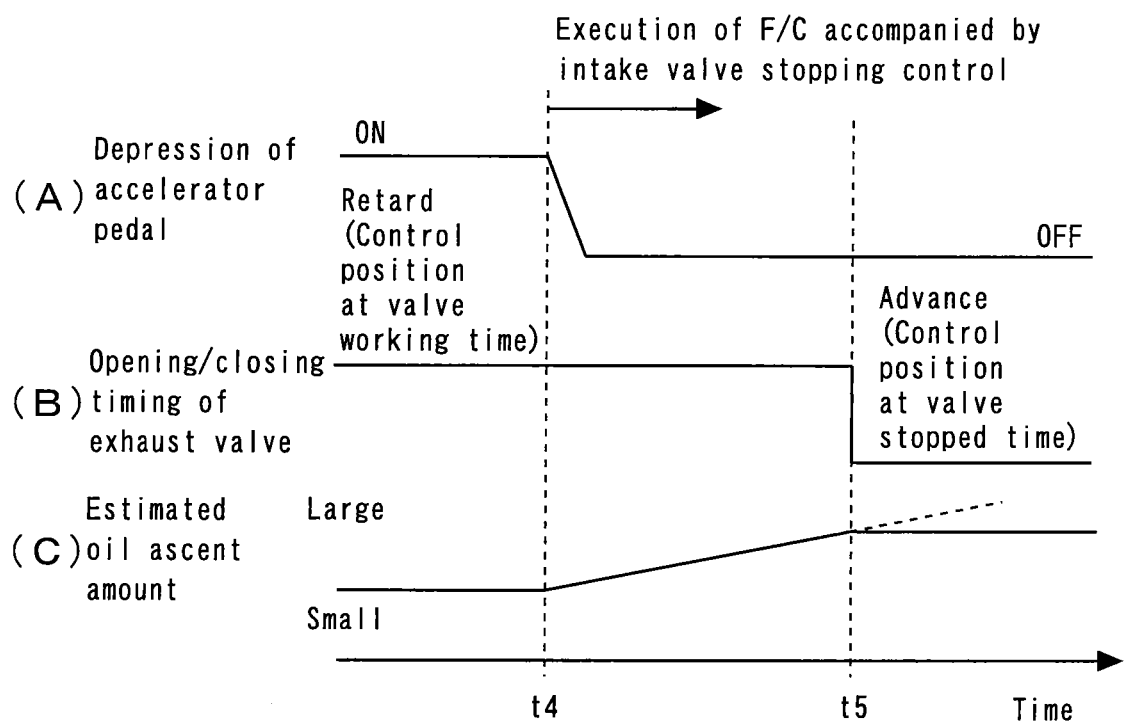
FIG. 9 is a time chart for describing characteristic control according to Embodiment 4 of the present invention.
Figure 10:
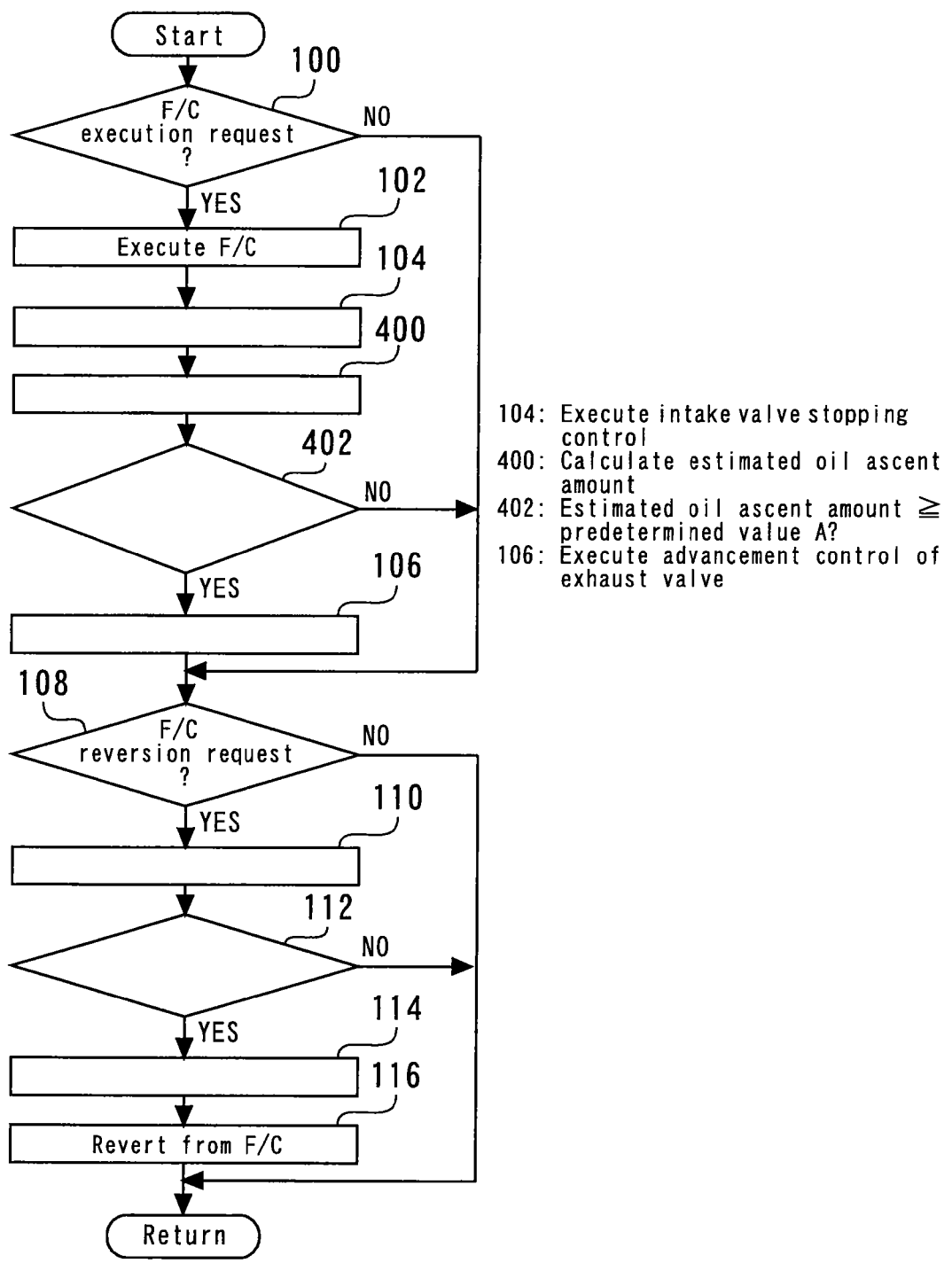
FIG. 10 is a flowchart of a routine that is executed in Embodiment 4 of the present invention.

Next, Embodiment 4 of the present invention is described referring to FIG. 9 and FIG. 10.

The system of the present embodiment can be realized by causing the ECU 40 to execute a routine shown in FIG. 10 that is described later instead of the routine shown in FIG. 4, using the hardware configuration shown in FIG. 1.

FIG. 9 is a time chart for describing characteristic control according to Embodiment 4 of the present invention. More specifically, FIG. 9(A) shows a waveform that represents on and off states with respect to depression of an accelerator pedal by a driver, FIG. 9(B) shows a waveform that represents control positions of the opening/closing timing of the exhaust valve 32, and FIG. 9(C) shows a waveform that represents changes in an estimated oil ascent amount during execution of intake valve stopping control.

The object for the control of the present embodiment is a time at which a fuel-cut operation that is accompanied by intake valve stopping control is being executed. The present embodiment is configured to estimate an oil ascent amount based on the number of engine revolutions, the oil temperature, and the duration of the fuel-cut operation. When a fuel-cut operation accompanied by intake valve stopping control is started at a time point t4, as shown in FIG. 9(C), the estimated oil ascent amount gradually increases.

A time point t5 shown in FIG. 9 represents a time point at which the estimated oil ascent amount has become equal to or greater than a predetermined value A. If the oil ascent amount continues to increase, the oil will eventually pass through the piston ring and enter the combustion chamber 14 side. The predetermined value A is a value that is previously set as a value that is lower by a predetermined amount than an oil ascent amount at which the above described state occurs in which oil enters the combustion chamber 14 side.

According to the present embodiment, a configuration is adopted so that, even in a case where a fuel-cut operation that is accompanied by intake valve stopping control has been started, as shown in FIG. 9(B), the aforementioned advancement control of the opening/closing timing of the exhaust valve 32 for suppressing an oil ascent is not executed immediately. Furthermore, according to the present embodiment, the aforementioned advancement control is executed only after a situation arises in which an estimated oil ascent amount becomes the aforementioned predetermined value A as a result of a fuel-cut operation being executed for a long time period.

FIG. 10 is a flowchart that illustrates a control routine that the ECU 40 executes according to Embodiment 4 to implement the above described functions. The processing of the present routine is repeatedly executed for each predetermined control period. Further, in FIG. 10, steps that are the same as steps shown in FIG. 4 with respect to Embodiment 1 are denoted by the same reference numerals, and a description of those steps is omitted or simplified below.

In the routine shown in FIG. 10, after intake valve stopping control has been started in the above described step 104, the ECU 40 calculates an estimated oil ascent amount (step 400). In the present step 400, as described above, the ECU 40 calculates the estimated oil ascent amount based on the number of engine revolutions, the oil temperature, and the fuel-cut operation duration. A map (not shown in the drawings) in which estimated oil ascent amounts are defined based on the relation with each of the aforementioned parameters is previously stored in the ECU 40, and an estimated oil ascent amount is acquired by referring to the map. In the map, the estimated oil ascent amounts are set so as to increase as the number of engine revolutions increases. Further, the estimated oil ascent amounts are set so as to increase as the oil temperature rises. In addition, the estimated oil ascent amounts are set so as to increase as the duration of a fuel-cut operation lengthens.

Next, the ECU 40 determines whether or not the estimated oil ascent amount that is calculated in the aforementioned step 400 is equal to or greater than the predetermined value A (step 402). If the ECU 40 determines as a result that the estimated oil ascent amount is less than the predetermined value A, the advancement control of the opening/closing timing of the exhaust valve 32 is not executed. In contrast, if the estimated oil ascent amount is equal to or greater than the predetermined value A, the advancement control of the opening/closing timing of the exhaust valve 32 is executed (step 106). The processing in the subsequent steps of the routine shown in FIG. 10 is the same as the processing in steps 108 to 116 of the routine shown in FIG. 4 that is described above.

According to the routine shown in FIG. 10 that is described above, under circumstances in which the estimated oil ascent amount is less than the aforementioned predetermined value A when a fuel-cut operation accompanied by intake valve stopping control has started, the advancement control of the opening/closing timing of the exhaust valve 32 for suppressing an oil ascent is not executed. In other words, a delay time that delays implementation of the aforementioned advancement control is determined in accordance with the estimated oil ascent amount. According to this control, under circumstances in which the estimated oil ascent amount is less than the predetermined value A, it is possible to prepare so as to be able to rapidly respond to a request to revert from a fuel-cut operation without a problem arising due to a response delay caused by the above described retardation control of the opening/closing timing of the exhaust valve 32 when reverting from the fuel-cut operation. Therefore, according to the control of the present embodiment, the number of cases in which a response delay that is caused by the aforementioned retardation control occurs can be reduced to a necessary minimum.

In the above described Embodiment 4, a configuration is adopted that calculates an estimated oil ascent amount based on the number of engine revolutions, the oil temperature, and the fuel-cut operation duration. However, a technique for estimating an oil ascent amount according to the present invention is not limited to the above described technique. More specifically, for example, in a case where the in-cylinder pressure sensor 50 for detecting an in-cylinder pressure is provided, as in the configuration of the internal combustion engine 10 shown in FIG. 1, since it is easier for an oil ascent to occur as the in-cylinder pressure becomes lower (as a negative pressure in the cylinder increases), a configuration may be adopted that estimates an oil ascent amount based on an in-cylinder pressure.

Further, in the above described Embodiment 4, a configuration is adopted in which the control of the present embodiment is combined with control of the above described Embodiment 1 (see FIG. 4). However, a configuration may be adopted in which the control of the present embodiment is combined with control of the above described Embodiment 2 (see FIG. 6) instead of the control of Embodiment 1.

Note that, in the foregoing Embodiment 4, "oil ascent amount estimation means" according to the above described seventh aspect of the present invention is realized by the ECU 40 executing the processing of the aforementioned step 400.

Other Control

Next, suitable control for suppressing an oil ascent while securing an engine braking force when executing a fuel-cut operation accompanied by valve stopping control is described.

Figure 11:
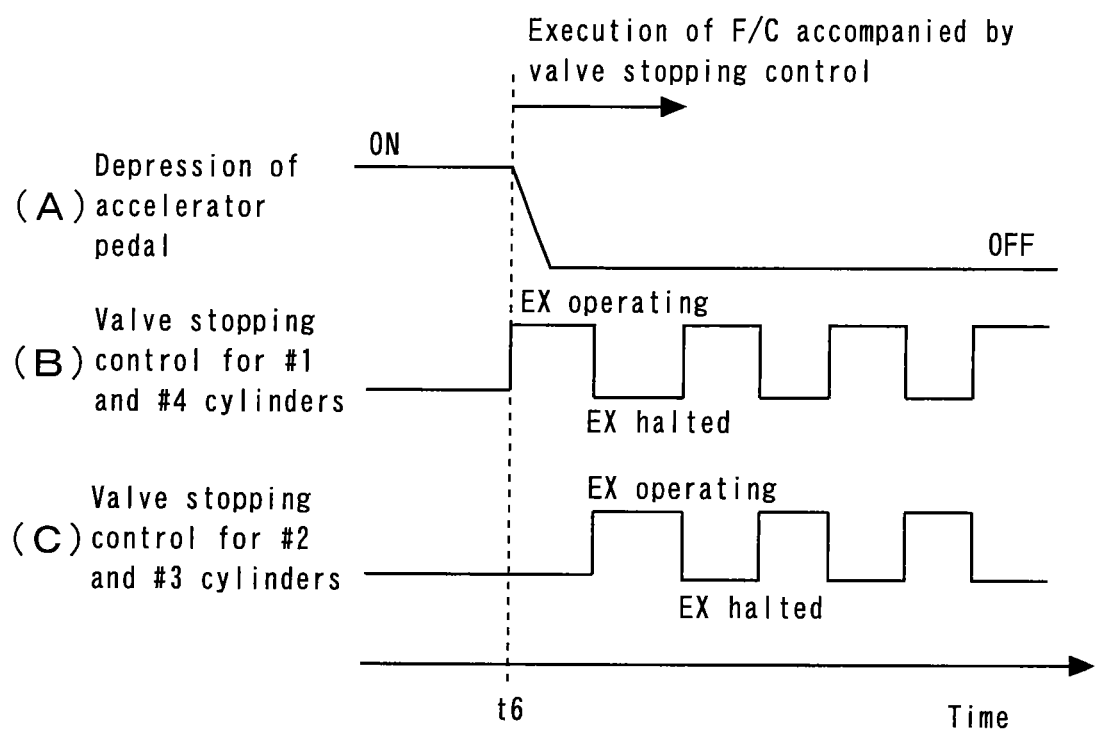
FIG. 11 is a time chart for describing suitable control when executing a fuel-cut operation that is accompanied by valve stopping control.

FIG. 11 is a time chart for describing suitable control when executing a fuel-cut operation that is accompanied by valve stopping control. More specifically, FIG. 11(A) shows a waveform that represents on and off states with respect to depression of an accelerator pedal by a driver, FIG. 11(B) shows a waveform that represents valve stopping control of the intake and exhaust valves 30 and 32 in the #1 and #4 cylinders, and FIG. 11(C) shows a waveform that represents valve stopping control of the intake and exhaust valves 30 and 32 in the #2 and #3 cylinders.

When valve stopping control is performed when executing a fuel-cut operation, if a technique is used that performs valve stopping control only with respect to the intake valve 30 and causes the exhaust valve 32 to operate as normal (this control is also referred to as "intake valve stopping control" here, as already described above), an oil ascent is liable to occur since a large negative pressure is liable to be generated inside the cylinder. However, when the intake valve stopping control is used, it is easy to secure an engine braking force by means of a pumping loss that arises accompanying opening and closing of the exhaust valve 32.

In contrast, when a technique is used that performs valve stopping control with respect to both the intake valve 30 and the exhaust valve 32 (hereunder, referred to as "intake and exhaust valve stopping control"), after several cycles have elapsed from the start of the valve stopping control, a stable state is entered in which a gas amount that is present inside the cylinder (inside the combustion chamber 14) is an amount that is equal to an air amount (under atmospheric pressure) that is in accordance with the capacity inside the cylinder when the piston 12 is at an intermediate position between top dead center and bottom dead center. Consequently, it is difficult for an oil ascent to occur during the intake and exhaust valve stopping control. However, when the intake and exhaust valve stopping control is used, since the aforementioned pumping loss is not present, it is difficult to secure an engine braking force.

Therefore, as shown in FIG. 11, a configuration may be adopted so as to perform the following control in a case where a fuel-cut operation accompanied by valve stopping control is executed when the accelerator pedal is in an "off" state at a time point t6. More specifically, according to this control example, a configuration may be adopted in which the four cylinders of the internal combustion engine 10 are divided into a first cylinder group consisting of the #1 cylinder and the

4 cylinder and a second cylinder group consisting of the #2 cylinder and the #2 cylinder, and thereafter, as shown in FIGS. 11(B) and 11(C), for each predetermined time period, a cylinder group for which the intake valve stopping control is executed and a cylinder group for which the intake and exhaust valve stopping control is executed are alternately switched.

According to the above described control, while securing an engine braking force by providing a cylinder group for which the intake valve stopping control is performed, it is possible to suppress an oil ascent by alternately switching a cylinder group for which the intake valve stopping control is executed and a cylinder group for which the intake and exhaust valve stopping control is executed.

DESCRIPTION OF SYMBOLS 10 internal combustion engine
12 piston
14 combustion chamber
16 crank chamber
18 intake passage
20 exhaust passage
24 throttle valve
26 in-cylinder fuel injection valve
30 intake valve
32 exhaust valve
34 intake variable valve operating apparatus
36 exhaust variable valve operating apparatus
38 catalyst
40 ECU (Electronic Control Unit)
42 crank angle sensor
44 exhaust cam angle sensor
46 accelerator pedal position sensor
48 oil temperature sensor
50 in-cylinder pressure sensor
52 shift position sensor

The invention claimed is:

1. A control apparatus for an internal combustion engine, comprising:
    an intake valve stop mechanism that is capable of changing an operating state of an intake valve between a valve working state and a closed-valve stopped state;
    an exhaust variable valve operating apparatus that is capable of changing a valve opening characteristic of an exhaust valve; and
    a controller that is programmed to:
    execute a fuel-cut operation when a predetermined execution condition is established during operation of the internal combustion engine;
    execute, at a time of execution of the fuel-cut operation, intake valve stopping control that changes the operating state of the intake valve from the valve working state to the closed-valve stopped state;
    execute a valve-stopped-time exhaust valve control that, at a time of execution of the intake valve stopping control, changes the valve opening characteristic of the exhaust valve so that an in-cylinder residual gas amount of gas that remains inside a cylinder when the exhaust valve is closed increases;
    detect a request to revert from the fuel-cut operation;
    execute a valve-reversion-time exhaust valve control that, when performing the valve-stopped-time exhaust valve control in a case where a request to revert from the fuel-cut operation accompanied by the intake valve stopping control has been detected, changes the valve opening characteristic of the exhaust valve so that the in-cylinder residual gas amount decreases;
    change, when a request to revert from the fuel-cut operation accompanied by the intake valve stopping control has been detected, the operating state of the intake valve from the closed-valve stopped state to the valve working state;
    determine, at a time of execution of the valve-reversion-time exhaust valve control, whether or not the valve opening characteristic of the exhaust valve has been controlled until the valve opening characteristic becomes a control amount that makes the in-cylinder residual gas amount less than or equal to a predetermined value; and
    execute, when a request to revert from the fuel-cut operation accompanied by the intake valve stopping control has been detected, in-cylinder pressure increase inhibition control that inhibits an increase in an in-cylinder pressure at a time of combustion during a period until it is determined that the valve opening characteristic of the exhaust valve has been controlled until the valve opening characteristic becomes the control amount.

2. The control apparatus for an internal combustion engine according to claim 1,
    wherein the in-cylinder pressure increase inhibition control is control that performs at least one of an operation to decrease a fuel injection amount, an operation to decrease a degree of opening of a throttle valve, and an operation to decrease a lift amount of the intake valve.

3. The control apparatus for an internal combustion engine according to claim 1,
    wherein the exhaust variable valve operating apparatus includes a phase varying mechanism capable of changing an opening/closing timing of the exhaust valve by changing a rotational phase of an exhaust camshaft relative to a rotational phase of a crankshaft,
    wherein, at a time of execution of the intake valve stopping control, the controller performs advancement control of the opening/closing timing of the exhaust valve,
    wherein, when a request to revert from the fuel-cut operation accompanied by the intake valve stopping control has been detected, the controller performs retardation control of the opening/closing timing of the exhaust valve, and
    wherein, at a time of execution of the retardation control, the controller determines whether or not an advance amount of the opening/closing timing of the exhaust valve has been controlled until the advance amount becomes less than or equal to a predetermined value.

4. The control apparatus for an internal combustion engine according to claim 1,
    wherein the controller detects or estimates an in-cylinder pressure, and
    wherein, at a time of execution of the intake valve stopping control, in a case where an in-cylinder pressure when the exhaust valve is open is less than or equal to a predetermined value, the controller determines that the valve opening characteristic of the exhaust valve has been controlled until the valve opening characteristic becomes the control amount.

5. The control apparatus for an internal combustion engine according to claim 1,
    wherein the controller estimates the oil ascent amount based on at least one of a number of engine revolutions, an oil temperature, a fuel-cut operation duration, and an in-cylinder pressure.

* * * * *